Figure 1:
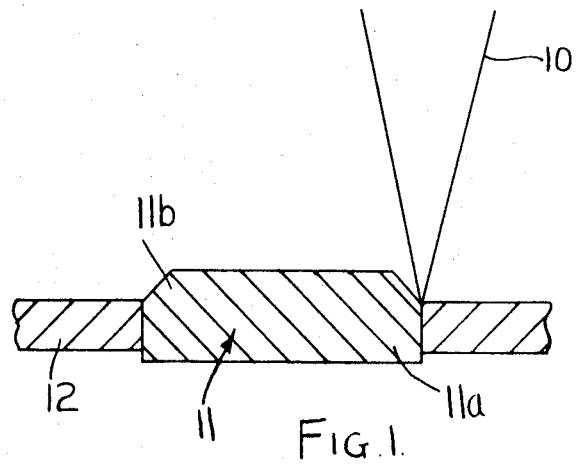

[11] 3,623,129

| | | | |
|---|---|---|---|
| [72] | Inventor | Brian Leslie Miles Kings Heath, Birmingham, England | |
| [21] | Appl. No. | 858,687 | |
| [22] | Filed | Sept. 17, 1969 | |
| [45] | Patented | Nov. 23, 1971 | |
| [73] | Assignee | Joseph Lucas (Industries) Limited Birmingham, England | |
| [32] | Priority | Sept. 23, 1968 | |
| [33] | | Great Britain | |
| [31] | | 45,075/68 | |

[54] ELECTRON BEAM WELDING
5 Claims, 4 Drawing Figs.

[52] U.S. Cl. ............................................. 219/121 EB,
219/137
[51] Int. Cl. ............................................. B23k 15/00
[50] Field of Search ............................................. 219/60, 61, 121, 123, 137; 29/480, 481

[56] References Cited
UNITED STATES PATENTS

| | | | | |
|---|---|---|---|---|
| 1,332,184 | 2/1920 | Adams | | 219/61 |
| 1,512,787 | 10/1924 | Morton | | 219/123 |
| 1,954,511 | 4/1934 | Adams | | 29/481 |
| 2,957,977 | 10/1960 | Sullivan | | 219/127 |
| 3,448,240 | 6/1969 | Steigerwald | | 219/121 |

Primary Examiner—J. V. Truhe
Assistant Examiner—Robert E. O'Neill
Attorney—Holman & Stern ABSTRACT: A method of electron beam welding a patch into an aperture in a finished component to form an assembly. A patch is inserted into a corresponding aperture in a component, excess material being provided on the face of the patch and/or the component to be presented to the electron beam. The electron beam is directed so that it first impinges on the excess material, and then the component is moved relative to the beam so that the beam impinges on and then follows the interface between the component and the patch. Thus, the patch is welded to the component around the periphery of the patch. The component is then moved relative to the beam so that the beam again impinges on the excess material, the action of the beam is then stopped, and the excess material is machined away.

PATENTED NOV 23 1971 3,623,129

INVENTOR
Brian Leslie Miles
BY Holman, Glascock,
Downing & Seebold
ATTORNEYS

ELECTRON BEAM WELDING

This invention relates to a method of electron beam welding a patch into an aperture in a finished component to form an assembly.

A problem exists in electron beam welding certain metal parts in that at the point where the beam first impinges on the parts, and at the point where the beam leaves the parts, depressions are produced in the parts, thereby necessitating machining both of the parts to leave a smooth surface. Where a patch is welded into an aperture in an already finished component, it is clearly unacceptable to have to machine original material from the finished component and the invention seeks to overcome this problem.

The invention resides in a method of electron beam welding a patch into an aperture in a finished component including the steps of inserting the patch into the aperture in the component, excess material being provided on the face of the patch and/or the component to be presented to the electron beam, directing the electron beam so that it first impinges on said excess material, imparting relative movement to the beam and the component so that the beam impinges on and then follows the interface between the component and the patch so that the patch is welded to the component around the periphery of the patch, imparting relative movement to the beam and the component so that the beam again impinges on said excess material, terminating the action of the beam and then machining away said excess material.

Figure 2:
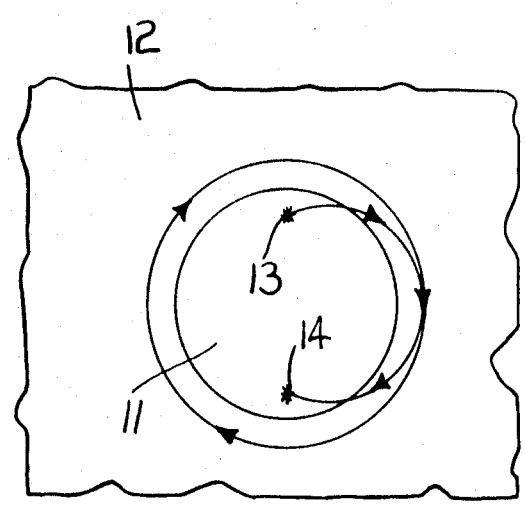
Figure 3:
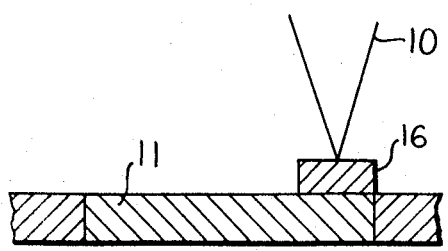
Figure 4:
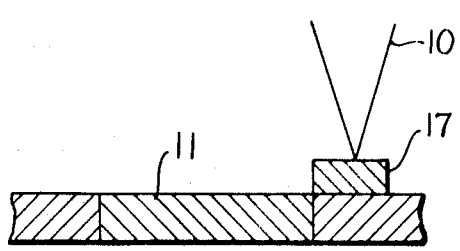

An example of the invention is illustrated in the accompanying drawings in which, FIG. 1 is a sectional side view, FIG. 2 is a plan view of FIG. 1, and FIGS. 3 and 4 are sectional side views similar to FIG. 1 showing excess material disposed on the patch and component respectively.

Referring to the drawing, it is desired to electron beam weld a circular titanium patch 11 into a circular hole in a titanium turbine blade 12 which is already of finished dimensions. The diameter of the titanium patch 11 is equal to the diameter of the hole in the turbine blade, but the thickness of the patch is between 1½ and 2 times the thickness of the portion of the turbine blade containing the hole. The patch is in the form of cylindrical portion 11a of axial length slightly greater than the thickness of the turbine blade, and a frustoconical portion 11b which when the patch is inserted into the hole in the turbine blade projects from one surface of the blade.

The turbine blade together with the patch are positioned on a movable table beneath an electron beam 10, and are so positioned that when the beam is switched on it will be directed onto the surface of the frustoconical portion of the patch at the position indicated at 13 in FIG. 2. Thus the depression which is produced as the beam first impinges on the part will be produced in the frustoconical portion of the patch. The beam 10 is then switched on, and the table is moved so that the beam moves outwardly until it impinges on the interface between the patch and the turbine blade, whereafter the table is so moved that the electron beam 10 follows the periphery of the patch, to weld the patch to the turbine blade. When the table has been moved through slightly more than 360°, the table is so moved that the beam moves inwardly so that the beam is once again impinging solely on the frustoconical portion of the patch. The beam is then switched off, the depression produced at the position indicated at 14 as the beam is switched off being produced in the frustoconical portion of the patch.

The blade, with the patch welded thereto is then removed from the table, and is machined to remove the frustoconical portion of the patch. Thus, only the excess material constituted by the frustoconical portion of the patch is machined from the turbine, and the finished surface of the remainder of the turbine blade remains untouched.

The excess material can be integral with the patch as shown in FIG. 1, or alternatively, the excess material can be in the form of a separate mask or masks such as that shown at 16 or 17 in FIGS. 3 or 4 respectively, preferably formed in the same material as the component. The mask or masks are arranged on the patch as in FIG. 3 or the component as in FIG. 4 or both and of course, become welded to the patch or the component or both during the welding process. The masks are finally removed by machining, and it will be appreciated that where the mask or masks are arranged on the component then the removal of the mask or masks does not entail machining original material from the component.

It will be appreciated that the excess material integral with the patch need not be in the form of a frustoconical portion, but could, for example, be in the form of a pair of raised lands on the surface of the patch on which the beam starts and finishes respectively.

Having thus described my invention what I claim as new and desire to secure by Letters Patent is:

1. A method of electron beam welding a patch into an aperture in a component to form an assembly including the steps of: inserting the patch into the aperture of the component; providing excess material on the surface of the assembly which at least in part is contiguous with the innerface between the patch and component; directing the electron beam so that it first impinges on said excess material; imparting relative movement between the beam and the assembly so that the beam intersects said innerface and said contiguous part and follows the innerface between the component and the patch to effect a weld; terminating the action of the beam on said excess material; and machining away said excess material from said assembly.

2. A method of claim 1 in which the excess material is disposed on said patch and is integral therewith.

3. A method as claimed in claim 1 in which the excess material is provided in the form of a mask arranged on the assembly.

4. A method as claimed in claim 3 in which the mask is disposed on the patch portion of the assembly.

5. A method as claimed in claim 3 in which the mask is disposed on the component portion of the assembly.

* * * * *